(12) United States Patent
Bosch et al.

(10) Patent No.: US 12,256,006 B1
(45) Date of Patent: Mar. 18, 2025

(54) API COMPLIANCE VERIFICATION BASED ON A DISTRIBUTED LEDGER

(71) Applicant: Cisco Technology, Inc., San Jose, CA (US)

(72) Inventors: Hendrikus G. P. Bosch, Aalsmeer (NL); Alessandro Duminuco, Milan (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 330 days.

(21) Appl. No.: 17/807,287

(22) Filed: Jun. 16, 2022

(51) Int. Cl.
*H04L 9/32* (2006.01)
*G06F 9/54* (2006.01)
*H04L 9/00* (2022.01)
*H04L 67/133* (2022.01)

(52) U.S. Cl.
CPC ............ *H04L 9/3213* (2013.01); *G06F 9/541* (2013.01); *G06F 9/547* (2013.01); *H04L 9/50* (2022.05); *H04L 67/133* (2022.05)

(58) Field of Classification Search
CPC ....... H04L 9/3213; H04L 67/133; H04L 9/50; G06F 9/541; G06F 9/547
See application file for complete search history.

(56) References Cited

U.S. PATENT DOCUMENTS

| | | | | |
|---|---|---|---|---|
| 6,510,236 B1 * | 1/2003 | Crane | ................. | G07C 9/37 382/116 |
| 9,774,586 B1 * | 9/2017 | Roche | ................. | H04L 63/08 |
| 9,965,613 B2 * | 5/2018 | Lee | ................. | H04W 4/60 |
| 10,044,723 B1 * | 8/2018 | Fischer | ................. | H04L 63/102 |
| 11,233,802 B1 * | 1/2022 | Rudeanu | ................. | H04L 63/0435 |
| 11,805,127 B1 * | 10/2023 | Sundar | ................. | H04L 63/083 |
| 2016/0164878 A1 * | 6/2016 | Nakano | ................. | G06F 21/10 726/4 |
| 2017/0031638 A1 * | 2/2017 | Kitagata | ................. | G06F 3/1206 |
| 2017/0359354 A1 * | 12/2017 | Matsugashita | ................. | H04L 63/08 |
| 2018/0060496 A1 * | 3/2018 | Bulleit | ................. | H04L 9/0643 |
| 2018/0288112 A1 * | 10/2018 | Miyamoto | ................. | H04N 21/42684 |
| 2019/0097994 A1 * | 3/2019 | Mathew | ................. | H04L 63/18 |
| 2019/0253251 A1 * | 8/2019 | Kobayashi | ................. | H04L 9/3247 |
| 2019/0294817 A1 * | 9/2019 | Hennebert | ................. | H04L 9/0861 |
| 2019/0295102 A1 | 9/2019 | Hines | | |
| 2020/0007322 A1 * | 1/2020 | Weldemariam | ................. | G06F 16/1805 |
| 2020/0035059 A1 * | 1/2020 | Campero | ................. | H04L 63/101 |
| 2020/0106610 A1 * | 4/2020 | Doddavula | ................. | H04L 9/0637 |
| 2020/0118068 A1 | 4/2020 | Turetsky et al. | | |
| 2020/0119905 A1 * | 4/2020 | Revankar | ................. | G06Q 20/06 |
| 2020/0162254 A1 * | 5/2020 | Moreno | ................. | H04L 9/3247 |
| 2020/0186329 A1 * | 6/2020 | Song | ................. | H04L 9/3247 |
| 2020/0211098 A1 * | 7/2020 | Miyamoto | ................. | H04L 9/3213 |
| 2020/0226242 A1 * | 7/2020 | Balaraman | ................. | G06F 21/64 |
| 2020/0358801 A1 * | 11/2020 | Allouche | ................. | H04L 63/123 |
| 2021/0036860 A1 * | 2/2021 | Ranganathan | ................. | H04L 63/102 |
| 2021/0042426 A1 | 2/2021 | Krishnaswamy et al. | | |
| 2021/0182915 A1 * | 6/2021 | Blaikie, III | ................. | G06Q 30/0276 |

(Continued)

*Primary Examiner* — Jason Chiang
(74) *Attorney, Agent, or Firm* — Baker Botts L.L.P.

(57) ABSTRACT

In one embodiment, a method by a first network apparatus includes receiving an authorization request from a user device redirected from a second network apparatus, generating an authorization response comprising a resource authorization token, and transmitting the resource authorization token to the user device and to a distributed ledger for storage, wherein the distributed ledger is a blockchain record.

20 Claims, 3 Drawing Sheets

(56) References Cited

U.S. PATENT DOCUMENTS

| | | | |
|---|---|---|---|
| 2021/0218726 A1* | 7/2021 | Sundararajan | H04L 67/02 |
| 2021/0390196 A1* | 12/2021 | Lavine | H04L 63/102 |
| 2021/0390533 A1* | 12/2021 | Fan | G06Q 20/3825 |
| 2021/0391992 A1* | 12/2021 | Schiffman | G06F 21/33 |
| 2021/0399893 A1* | 12/2021 | Withrow | G06F 21/10 |
| 2022/0269693 A1* | 8/2022 | Shaked | G06F 16/27 |
| 2022/0417241 A1* | 12/2022 | Zilbershtein | H04L 9/3247 |
| 2023/0091451 A1* | 3/2023 | Fujii | G06Q 20/3674 |
| | | | 705/66 |
| 2023/0141966 A1* | 5/2023 | Weeden | H04L 63/0807 |
| | | | 713/185 |
| 2023/0162202 A1* | 5/2023 | Wagner | G06Q 20/065 |
| | | | 705/317 |
| 2023/0214792 A1* | 7/2023 | Lee | G06Q 20/02 |
| | | | 705/75 |
| 2023/0222488 A1* | 7/2023 | Campbell | H04L 9/3239 |
| | | | 705/66 |
| 2023/0377394 A1* | 11/2023 | Rafferty | G07C 9/00912 |
| 2023/0379179 A1* | 11/2023 | Davis | H04L 9/3247 |

* cited by examiner

US 12,256,006 B1

API COMPLIANCE VERIFICATION BASED ON A DISTRIBUTED LEDGER

TECHNICAL FIELD

The present disclosure relates generally to a field of authentication and authorization, and more particularly, to Application Programming Interface (API) compliance verification based on storing authorization tokens on a distributed ledger.

BACKGROUND

An unprecedented number of enterprises are adopting cloud services because cloud services may reduce the cost and complexity of owning and operating hardware infrastructure including computers and networks. Because enterprises do not need to invest in information technology infrastructure, purchase hardware, or buy software licenses, the benefits may comprise low up-front costs, rapid return on investment, rapid deployment, customization, flexible use, and solutions that can make use of new innovations. Furthermore, cloud providers that have specialized in a particular area may be able to bring advanced services. Cloud services may be scalable because cloud computing may offer unlimited processing and storage capacity. The cloud may also be reliable in that the cloud enables access to applications and documents anywhere in the world via the Internet. Cloud computing may also be considered efficient because it allows enterprises to free up resources to focus on innovation and product development. Cloud services may comprise cloud applications, data storages, or any suitable cloud resources. A cloud resource may be accessed as web services. As the number of cloud services for an enterprise increases, access control to each of the cloud services may become more complicated. An enterprise may face significant challenges in maintaining compliance through authenticating users to access a resource.

DESCRIPTION OF EXAMPLE EMBODIMENTS

Overview

In particular embodiments, a first network apparatus may comprise one or more processors and one or more computer-readable non-transitory storage media coupled to one or more of the processors. The one or more computer-readable non-transitory storage media may comprise instructions operable when executed by one or more of the processors to cause the first network apparatus to receive an authorization request from a user device redirected from a second network apparatus. The processors may be operable when executing the instructions to generate an authorization response comprising a resource authorization token. The processors may be operable when executing the instructions to transmit the resource authorization token to a distributed ledger for storage and to the user device, wherein the distributed ledger is a blockchain record.

In particular embodiments, a method for service authentication based on storing authorization tokens on a distributed ledger may comprise receiving an authorization request from a user device associated with a user redirected from a first network apparatus, wherein the first network apparatus redirected the user device based on a determination that a request to access a resource generated by the user device did not comprise a session cookie. The method may further comprise generating an authorization response comprising a resource authorization token. The method may comprise transmitting the resource authorization token to a distributed ledger for storage and to the user device, wherein the distributed ledger is a blockchain record.

In particular embodiments, one or more computer-readable non-transitory storage media may embody software that is operable on a first network apparatus when executed to receive an authorization request from a user device redirected from a second network apparatus. The software may be operable when executed to generate an authorization response comprising a resource authorization token. The software may be operable when executed to transmit the resource authorization token to a distributed ledger for storage and to the user device, wherein the distributed ledger is a blockchain record.

EXAMPLE EMBODIMENTS

Figure 1:
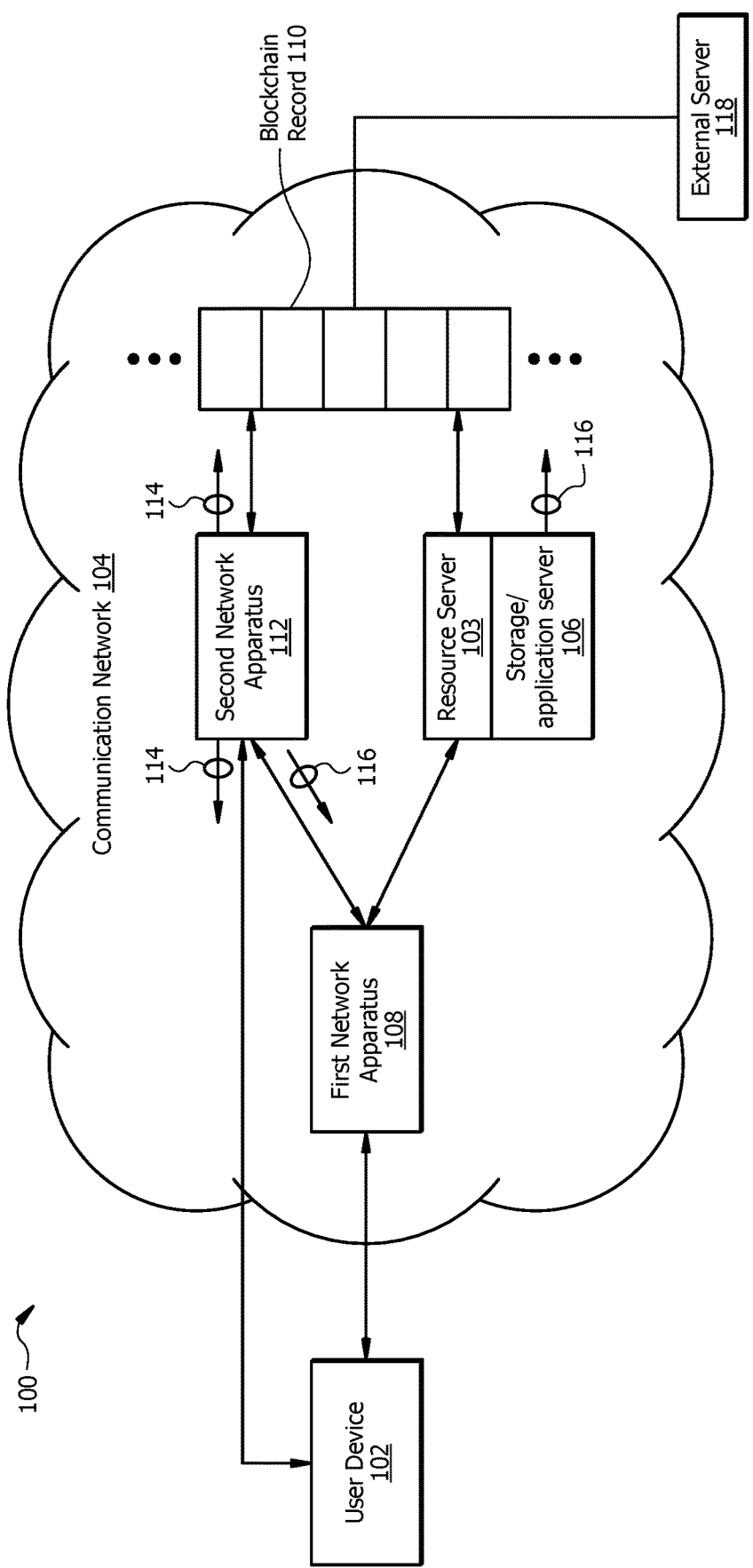
FIG. 1 illustrates an example message flow for authorizing a request to access a resource by a user.

FIG. 1 illustrates an example system where a user accesses a cloud resource. In the example illustrated in FIG. 1, a user device 102 associated with a first user may be communicatively coupled to a communication network 104. The user device 102 may access one or more resource servers 103 located in cloud systems. The one or more resource servers 103 may comprise a storage and/or application server 106. As an example and not by way of limitation, the user device 102 may access the storage server 106 located in a public cloud to access a cloud data storage service. A communication session between the user device 102 and the storage server 106 may be established. Traffic for the communication session may go through a first network apparatus 108 of the communication network 104. In particular embodiments, the first network apparatus 108 may be any suitable network apparatus that connects the communication network 104 and the public cloud. As another example and not by way of limitation, the user device 102 may access the application server 106 located in a private cloud to access an application. A communication session between the user device 102 and the application server 106 may be established. Traffic for the communication session may also go through the first network apparatus 108 of the communication network 104.

In particular embodiments, the first user may undergo an authentication process in order to access the resources in one or more resource servers 103. In such a scenario, a blockchain record 110 may be stored in the communication network 104 to maintain a log of authorization and/or access tokens generated during the authentication process. Embodiments disclosed herein leverage blockchain technology to provide a secure and distributed approach for establishing authentication of a user and for maintaining a compliance log. For example, authorization may need to be able to determine what actions a user can perform when an application has access to potentially sensitive data and the application is publicly accessible by internal users or by third parties. A second network apparatus 112, operating as an authenticator, may generate an authorization token 114 indicating authorized actions for a user associated with the user device to perform while accessing a resource or a group of resources that the user is authorized to access. In embodiments, the second network apparatus 112 may be an OpenID Connect (OIDC) compliant identity provider. The second network apparatus 112 may further generate an access token 116, for an authorized user, to provide access to one or more resource servers 103. In embodiments, the blockchain record 110 may receive and store the generated authorization tokens 114 and access tokens 116. The tokens 114, 116 may be stored using any suitable encryption technique and may be accessible by an external server 118 for a compliance process. In particular embodiments, the external server 118 may operate under compliance checking. For example, the external server 118 may access the blockchain record 110 to assert the intended use of an application service as attested by the issuance of tokens 114, 116. In these embodiments, the external server 118 may verify or settle, through the blockchain record 110, charges and/or disputes between clients of a service (i.e., user device 102) and a service provider (i.e., resource server 103).

In particular embodiments, first network apparatus 108 may be located at a network boundary that enables a local network to connect to an external network. In particular embodiments, the first network apparatus 108 may be equipped with a router function and a proxy function. The first network apparatus 108 may implement an identity-aware proxy through authentication and authorization using the router function and proxy function. The identity-aware proxy may enable improvement of application security governance for legacy and new applications without changes to application logic by allowing the enterprise to centralize user access control for applications. In particular embodiments, each of the router and proxy functions may be implemented on a separate computing machine or may be collocated at a single computing machine. The router function may enable the computing devices within a local network to access external networks including one or more cloud systems and the Internet. The router function may also terminate a request to access a resource and determine whether the request has been authenticated and/or authorized. The proxy function may establish a first communication session with a user device and may also establish a second communication session with a resource server (for example, the resource server 103) providing a requested resource. The proxy function may relay traffic between the user device 102 and the resource server 103 via the first communication session and the second communication session. The proxy function may behave as if the proxy function is the resource server 103 to the user device 102 while the proxy function may also behave as if the proxy function is the user device 102 to the resource server 103. In particular embodiments, the router function and the proxy function may collocate at a single network apparatus (e.g., first network apparatus 108).

The first network apparatus 108 may receive a request to access a resource from a user device 102 associated with a user. Accessing the resource may be provided as a web service. The request may be a Hypertext Transfer Protocol (HTTP) request. In particular embodiments, the request may not comprise a session cookie. The session cookie in the request may indicate that a communication session from the user device 102 to access the resource has been established. In other words, the user has been authorized to access the resource using the user device 102. The first network apparatus 108 may determine that the request does not comprise a session cookie. As an example and not by way of limitation, the resource may be an application server 106 in a cloud. As another example and not by way of limitation, the resource may be a storage server 106 in a cloud. The first network apparatus 108 may maintain the resources that can be accessed from the communication network 104. In particular embodiments, the resource server 103 is located in the external network.

As an example and not by way of limitation, the user device 102 associated with a first user may try to access the storage server 106 located in a public cloud for a cloud data storage service. A HTTP request to access the storage server 106 from the user device 102 may arrive at the first network apparatus 108 of the communication network 104. The first network apparatus 108 may check whether the storage server 106 is an available cloud resource. The first network apparatus 108 may also determine whether the request message comprises a session cookie. As another example and not by way of limitation, the user device 102 associated with the first user may try to access an application server 106 located in a private cloud. A HTTP request to access the application server 106 from the user device 102 may arrive at the first network apparatus 108. The first network apparatus 108 may check whether the application server 106 is one of the available cloud resources. The first network apparatus 108 may also determine whether the request message comprises a session cookie. Although this disclosure describes receiving a request to access a resource in a particular manner, this disclosure contemplates receiving a request to access a resource in any suitable manner.

In particular embodiments, the first network apparatus 108 may generate an authorization request. The authorization request may comprise an identifier associated with the user, an identifier associated with the user device 102, and/or an identifier associated with the resource. In exemplary embodiments, the identifier associated with the user device 102 may be an Internet Protocol (IP) address associated with the user device 102. The authorization request may also comprise credentials received from the user device 102. The authorization request may further comprise a type of an action requested on the resource. In particular embodiments, the first network apparatus 108 may send the authorization request to the second network apparatus 112, and the second network apparatus 112 may be equipped with the identity provider function. The identity provider function may authenticate users and may authorize the users to perform one or more particular actions to a resource. In particular embodiments, the identity provider function may collocate with the router function and the proxy function. In particular embodiments, the identify provider function may locate apart from the router function and the proxy function.

As an example and not by way of limitation, continuing with a prior example, the first network apparatus 108 may generate an authorization request for the request from the user device 102 to access the application server 106. The authorization request may comprise a user identifier associated with the user, a device identifier associated with the user device 102, and/or a resource identifier associated with the application server 106. The first network apparatus 108 may send the generated authorization request to an identity provider server. In particular embodiments, the identity provider server (i.e., the second network apparatus 112) may be collocated with the first network apparatus 108. Although this disclosure describes sending an authorization request in a particular manner, this disclosure contemplates sending an authorization request in any suitable manner.

In particular embodiments, the identity provider function of the second network apparatus 112 may authenticate the user. The identity provider function may also determine whether the user is authorized to access the resource using the user device 102. In particular embodiments, the second network apparatus 112 may perform an attribute-based access control (ABAC). ABAC defines an access control paradigm whereby access rights may be granted to users through the use of policies that combine attributes together. The policies may use any type of attributes (user attributes, resource attributes, object, environment attributes etc.). This model may support Boolean logic, in which rules contain "if, then" statements about who is making the request, the resource, and the action. For example: IF the requestor is a manager, THEN allow read/write access to sensitive data. The policies in ABAC may be able to express a complex Boolean rule set that can evaluate many different attributes. Attribute values may be set-valued or atomic-valued. Set-valued attributes may contain more than one atomic value. Examples of set-valued attributes may comprise role and project. Atomic-valued attributes may contain only one atomic value. Examples of atomic-valued attributes may comprise clearance and sensitivity. Attributes may be compared to static values or to one another, thus enabling relation-based access control. As an example and not by way of limitation, continuing with a prior example, the identity provider server may, on receiving an authorization request from the first network apparatus 108, authenticate the user. The identity provider server may also authorize whether the user is authorized to access the application server 106 on the user device 102. The identity provider server may determine one or more actions allowed for the user to access the application server 106. As an example, the user may be allowed only to retrieve critical data on the application server 106. As another example, the user may be allowed to retrieve and update critical data on the application server 106. As yet another example, the user may be allowed to retrieve, update and delete critical data on the application server 106. The allowed actions for the user may be determined based on various attributes associated with the user and the resource. The identity provider server may send an authorization response to the first network apparatus 108. Although this disclosure describes authorizing the user to access a resource in a particular manner, this disclosure contemplates authorizing the user to access a resource in any suitable manner.

In particular embodiments, the first network apparatus 108 may receive an authorization response comprising a resource authorization token from the second network apparatus 112. The first network apparatus 108 may determine that the user is authorized to access the resource using the user device 102 based on the received resource authorization token. The first network apparatus 108 may cache the resource authorization token as the session cookie. The first network apparatus 108 may send a message to the user device 102 to complete an establishment of a first communication session with the user device 102. The message may comprise the resource authorization token. The resource authorization token may be used by the user device 102 as the session cookie in subsequent requests for accessing the resource. As an example and not by way of limitation, continuing with a prior example, the first network apparatus 108 receives an authorization response from the identity provider server. The authorization response may comprise a resource authorization token. The resource authorization token may comprise information associated with access rights for the user to access the application server 106 using the user device 102. The first network apparatus 108 may determine that the user is allowed to access the application server 106 based on the resource authorization token. The first network apparatus 108 may complete an establishment of a communication session with the user device 102 by sending a message to the user device 102. The message may comprise the resource authorization token. The user device 102 may use the resource authorization token as a session cookie for the following request messages on the communication session. Although this disclosure describes establishing a communication session based on authorization in a particular manner, this disclosure contemplates establishing a communication session based on authorization in any suitable manner.

Figure 2:
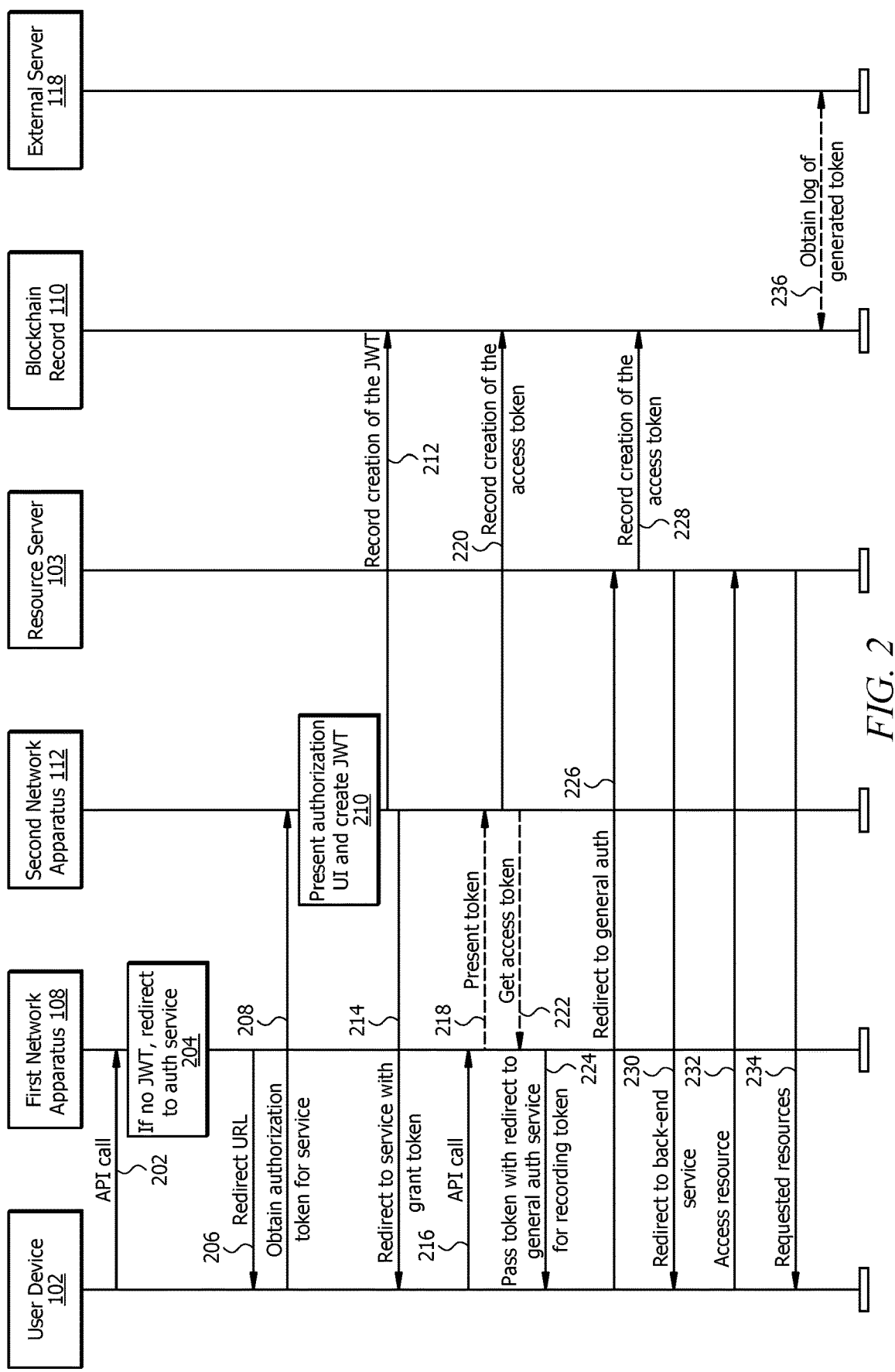
FIG. 2 illustrates an example traffic relay between a user device and a resource server.

FIG. 2 illustrates an example traffic relay between the user device 102 and resource server 103 for authorizing a request to access a resource by a user. At step 202, the user device 102 may send an API call comprising an HTTP request to access an application server 106 (referring to FIG. 1) of the resource server 103. At step 204, upon receiving the HTTP request, the router function of the first network apparatus 108 may check whether the request contains a session cookie in the HTTP request headers. If the session cookie is not present, the router function of the first network apparatus 108 may send a redirect message to the user device 102 at step 206, where the redirect message may cause the user device 102 to contact the identity provider function of the second network apparatus 112 and perform an authentication. At step 208, the user device 102 transmits a request to obtain a resource authorization token after being redirected by the first network apparatus 108. At step 210, the user device 102 may perform an authentication process with the second network apparatus 112. Step 210 may comprise a plurality of message exchanges. In embodiments, the second network apparatus 112 may operate as an authenticator for the user to access a resource from the resource server 103. In particular embodiments, the second network apparatus 112 may be an OpenID Connect (OIDC)-compliant identity provider server. The OIDC is a simple identity layer on top of the OAuth protocol. The OIDC may allow the first network apparatus 108 to verify the identity of a user based on the authentication performed by an identity provider server, as well as to obtain basic profile information about the user in an interoperable and representational state transfer (REST)-like manner. OIDC may specify a RESTful HTTP Application Programming Interface (API), using JavaScript Object Notation (JSON) as a data format.

After successfully authenticating the user, the second network apparatus 112 may generate an authorization response comprising a resource authorization token. In embodiments, the resource authorization token is a JavaScript Object Notation (JSON) Web Token (JWT) provided through an Oauth protocol. The resource authorization token may indicate authorized actions for a user associated with the user device 102 to perform while accessing a resource or a group of resources that the user is authorized to access. In particular embodiments, the resource authorization token may indicate the authorized actions for the user to perform while accessing the resource. The authorized actions for the user may be determined based on attributes associated with the user and the requested resource. When the user requests another action to the resource, the first network apparatus 108 may allow the requested action to the resource if the requested action is one of the authorized actions. Although this disclosure describes authorization for a plurality of actions to a resource in a particular manner, this disclosure contemplates authorization for a plurality of actions to a resource in any suitable manner.

In particular embodiments, the resource authorization token may indicate the resources that the user is authorized to access. The first network apparatus 108 may allow the user to access a second resource without performing additional authorization procedure if the second resource is one of the authorized resources. Although this disclosure describes achieving single sign-on (SSO) feature using an identity-aware proxy in a particular manner, this disclosure contemplates achieving SSO feature using an identity-aware proxy in any suitable manner.

At step 212, the second network apparatus 112 may transmit the generated resource authorization token to a distributed ledger for storage. In particular embodiments, the distributed ledger may be the blockchain record 110 stored in the communication network 104 (referring to FIG. 1). At step 214, the second network apparatus 112 may transmit the generated resource authorization token to the user device 102 for further utilization in accessing a resource. At step 216, the user device 102 may provide the received resource authorization token to the first network apparatus 108 through an API call. At step 218, the proxy function of the first network apparatus 108 may present the received resource authorization token back to the identity provider function of the second network apparatus 112. Upon receiving the resource authorization token from the first network apparatus 108, the second network apparatus 112 may generate an access token, wherein the access token provides access to the resource server 103. At step 220, the second network apparatus 112 may transmit the generated access token to the blockchain record 110 for storage. In particular embodiments, step 220 may be optional, or the function of transmitting the access token to the blockchain record 110 may be performed by a different component (for example, resource server 103). At step 222, the second network apparatus 112 may transmit the generated access token to the first network apparatus 108 for further utilization by the user operating the user device 102.

After the proxy function of the first network apparatus 108 validates the access token, the proxy function may determine whether the user is authorized to access the storage and/or application server 106 based on the resource authorization token. At step 224, the proxy function of the first network apparatus 108 may send a message to the user device 102 to complete the establishment of a first communication session between the first network apparatus 108 and the user device 102. The message may comprise a session cookie and the access token. In particular embodiments, the session cookie may be the resource authorization token received from the second network apparatus 112. In particular embodiments, the proxy function may generate the session cookie based on the received resource authorization token. During step 224, the first network apparatus 108 may further exchange messages with the resource server 103 to establish a second communication session between the first network apparatus 108 and the resource server 103. The first network apparatus 108 may relay traffic between the user device 102 and the resource server 103 via the first communication session and the second communication session.

As an example and not by way of limitation, the user device 102, or the first network apparatus 108 on behalf of the user device 102, may transmit a request to establish the second communication session at step 226. The request may include the access token generated by the second network apparatus 112. At step 228, the resource server 103 may transmit the generated access token to the blockchain record 110 for storage. In particular embodiments, step 228 may be optional, and may be implemented if step 220 does not occur. At step 230, the resource server 103 sends a HTTP response to complete an establishment of the second communication session. Although this disclosure describes relaying traffic between a user device and a resource server through a first communication session and a second communication session at a proxy in a particular manner, this disclosure contemplates relaying traffic between a user device and a resource server in any suitable manner. Further, although this disclosure describes authorization with an OIDC-compliant identity provider in a particular manner, this disclosure contemplates authorization with the OIDC-compliant identity provider in any suitable manner.

In particular embodiments, the first network apparatus 108 may relay traffic between the user device 102 and the resource server 103 via the first communication session and the second communication session. At step 232, the user device 102 may transmit a request to the resource server 103 to access a resource. The first network apparatus 108 may receive the request via the first communication session from the user device 102 and forward it to the resource server 103 using the second communication session. At step 234, the resource server 103 may send the requested one or more resources to the authorized user through the first network apparatus 108. The first network apparatus 108 may receive the response from the resource server 103 using the second communication session and may relay the response to the user device 102 via the first communication session. At step 236, the external server 118 may be in communication with the blockchain record 110. Step 236 may comprise a plurality of message exchanges between the external server 118 and blockchain record 110. The external server 118 may transmit a request to access the blockchain record 110 in order to determine one or more resource authorization tokens 114 and/or access tokens 116 generated for a user. The external server 118 may assess all operations allowed for that given user based on analyzing the one or more resource authorization tokens 114 and/or access tokens 116.

Figure 3:
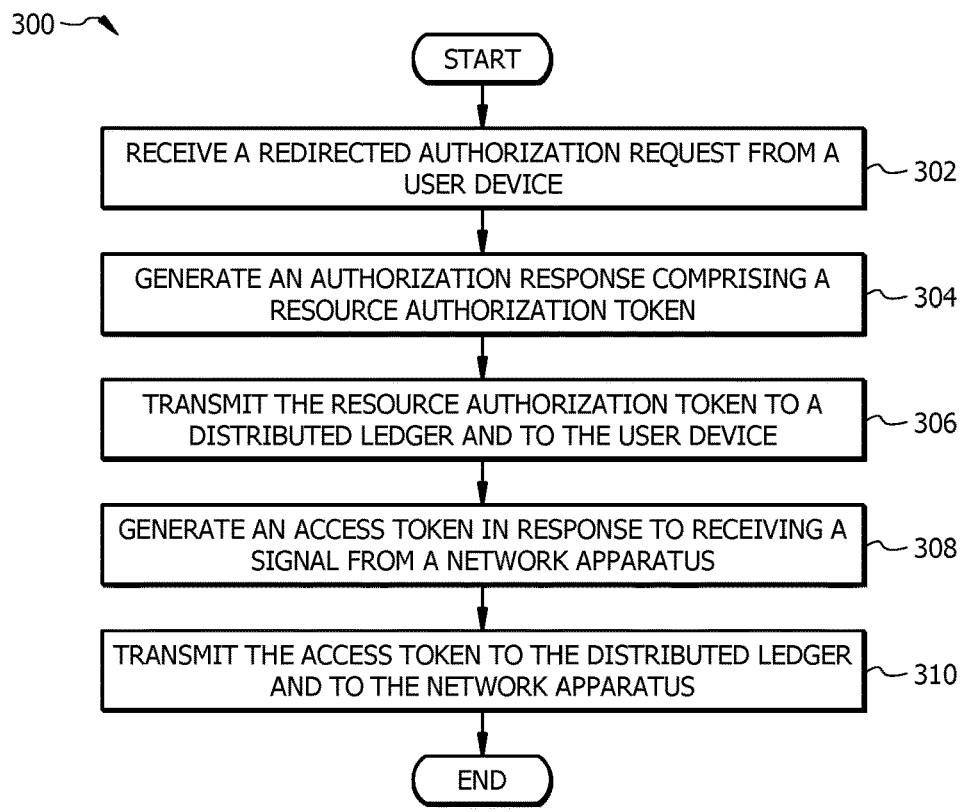
FIG. 3 illustrates an example method for service authentication based on storing authorization tokens on a distributed ledger.

FIG. 3 illustrates an example method 300 for service authentication and storing authorization tokens 114 (referring to FIG. 1) on the blockchain record 110 (referring to FIG. 1). The method 300 may begin at step 302, where the second network apparatus 112 (referring to FIG. 1) may receive an authorization request to access a resource from the user device 102 (referring to FIG. 1) associated with a user. The request may have been redirected from the first network apparatus 108 (referring to FIG. 1), where the first network apparatus 108 determined that the user device 102 was not authorized. The second network apparatus 112 may authenticate the user and determine whether the user is authorized to access the resource using the user device 102. At step 304, after authenticating the user, the second network apparatus 112 may generate an authorization response comprising a resource authorization token 114. At step 306, the second network apparatus 112 may transmit the authorization response to the user device 102 and the resource authorization token 114 to the blockchain record 110. The resource authorization token 114 may be transmitted to the blockchain record 110 for storage, and the authorization response comprising the resource authorization token 114 may be transmitted to the user device 102 for further utilization in accessing a resource.

At step 308, the second network apparatus 112 may receive the resource authorization token 114 from the first network apparatus 108 in an API call. In embodiments, the user device 102 may have relayed the authorization response from the second network apparatus 112 to the first network apparatus 108. The first network apparatus 108 may present the received resource authorization token 114 to obtain an access token 116 (referring to FIG. 1) for a resource. Upon receiving the resource authorization token 114 from the first network apparatus 108, the second network apparatus 112 may generate the access token 116, wherein the access token 116 provides access to the resource server 103 (referring to FIG. 1). At step 310, the second network apparatus 112 may transmit the generated access token 116 to the blockchain record 110 for storage and to the first network apparatus 108 for further utilization by the user operating the user device 102. In embodiments, a different component other than the second network apparatus 112 may transmit the access token 116 to the blockchain record 110. The method 300 may then proceed to end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for service authentication and storing authorization tokens on the blockchain record 110 including the particular steps of the method of FIG. 3, this disclosure contemplates any suitable method for service authentication and storing authorization tokens including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
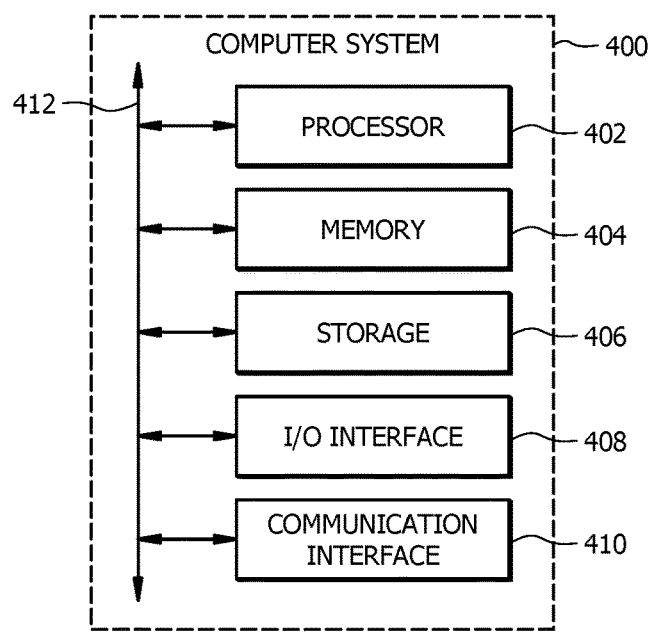
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate. Further, each one of user device 102, first network apparatus 108, second network apparatus 112, and resource server 103 in FIG. 1 may be any suitable computer system, such as the illustrated computer system 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network apparatus, comprising:
   one or more processors; and
   one or more computer-readable non-transitory storage media comprising instructions that, when executed by the one or more processors, cause one or more components of the first network apparatus to perform operations comprising:
      receiving an authorization request from a user device redirected from a second network apparatus;
      generating an authorization response comprising a resource authorization token;
      transmitting the resource authorization token to the user device and to a distributed ledger for storage, wherein the distributed ledger is a blockchain record;
      generating an access token in response to receiving the resource authorization token from the second network apparatus; and
      transmitting the generated access token to the distributed ledger for storage,
   wherein the user device is redirected based on a determination that an HTTP request header to access a resource did not comprise a session cookie, wherein the resource authorization token generated by the first network apparatus is stored and used as the session cookie in subsequent requests for accessing the resource, wherein the first network apparatus comprises an identity provider function operable to perform attribute-based access control.

2. The first network apparatus of claim 1, wherein the resource authorization token is a JavaScript Object Notation (JSON) Web Token provided through an Oauth protocol.

3. The first network apparatus of claim 1, wherein the resource authorization token indicates:
   at least one of a plurality of authorized actions for a user associated with the user device to perform while accessing the resource; and
   a plurality of resources that the user is authorized to access.

4. The first network apparatus of claim 1, wherein the first network apparatus is configured to:
   authenticate a user associated with the user device; and
   determine whether the user is authorized to access the resource using the user device, wherein the first network apparatus is an OpenID Connect (OIDC) compliant identity provider.

5. The first network apparatus of claim 1, wherein the resource authorization token is transmitted to the second network apparatus from the user device through an application programming interface (API) call.

6. The first network apparatus of claim 1, wherein the distributed ledger is configured to receive a request for access by an external server to assess operations allowed for a given user based on analyzing one or more resource authorization tokens stored in the distributed ledger.

7. The first network apparatus of claim 5, the operations further comprising transmitting the generated access token to the second network apparatus for utilization by the user device.

8. A method for service authentication based on storing authorization tokens on a distributed ledger, comprising:
   receiving an authorization request from a user device associated with a user redirected from a first network apparatus;
   generating an authorization response comprising a resource authorization token;
   transmitting the resource authorization token to the user device and to the distributed ledger for storage, wherein the distributed ledger is a blockchain record;
   generating an access token in response to receiving the resource authorization token from the first network apparatus; and
   transmitting the generated access token to the distributed ledger for storage,
   wherein the user device is redirected based on a determination that an HTTP request header to access a resource did not comprise a session cookie, wherein the resource authorization token is generated by a second network apparatus and is stored and used as the session cookie in subsequent requests for accessing the resource, wherein the second network apparatus comprises an identity provider function operable to perform attribute-based access control.

9. The method of claim 8, wherein the resource authorization token is a JavaScript Object Notation (JSON) Web Token provided through an Oauth protocol.

10. The method of claim 8, wherein the resource authorization token indicates:
   at least one of a plurality of authorized actions for the user associated with the user device to perform while accessing the resource; and
   a plurality of resources that the user is authorized to access.

11. The method of claim 8, further comprising:
authenticating the user associated with the user device; and
determining whether the user is authorized to access the resource using the user device through the second network apparatus, wherein the second network apparatus is an OpenID Connect (OIDC) compliant identity provider.

12. The method of claim 8, wherein the resource authorization token is transmitted to the first network apparatus from the user device through an application programming interface (API) call.

13. The method of claim 8, wherein the distributed ledger is configured to receive a request for access by an external server to assess operations allowed for a given user based on analyzing one or more resource authorization tokens stored in the distributed ledger.

14. The method of claim 12, further comprising transmitting the generated access token to the first network apparatus for utilization by the user device.

15. A non-transitory computer-readable medium comprising instructions that are configured, when executed by a processor, to:
receive an authorization request from a user device redirected from a first network apparatus;
generate an authorization response comprising a resource authorization token;
transmit the resource authorization token to the user device and to a distributed ledger for storage, wherein the distributed ledger is a blockchain record;
generate an access token in response to receiving the resource authorization token from the first network apparatus;
transmit the generated access token to the distributed ledger for storage; and
perform attribute-based access control via an identity provider function,
wherein the user device is redirected based on a determination that an HTTP request header to access a resource did not comprise a session cookie, wherein the generated resource authorization token is stored and used as the session cookie in subsequent requests for accessing the resource.

16. The non-transitory computer-readable medium of claim 15, wherein the resource authorization token is a JavaScript Object Notation (JSON) Web Token provided through an Oauth protocol.

17. The non-transitory computer-readable medium of claim 15, wherein the resource authorization token indicates:
at least one of a plurality of authorized actions for a user associated with the user device to perform while accessing the resource; and
a plurality of resources that the user is authorized to access.

18. The non-transitory computer-readable medium of claim 15,
wherein the resource authorization token is transmitted to the first network apparatus from the user device through an application programming interface (API) call.

19. The non-transitory computer-readable medium of claim 15,
wherein the distributed ledger is configured to receive a request for access by an external server to assess operations allowed for a given user based on analyzing one or more resource authorization tokens stored in the distributed ledger.

20. The non-transitory computer-readable medium of claim 18, wherein the instructions are further configured to:
transmit the generated access token to the first network apparatus for utilization by the user device.

* * * * *